United States Patent [19]
Tolson

[11] Patent Number: 5,277,297
[45] Date of Patent: Jan. 11, 1994

[54] CONTROLLABLE LENGTH CONVEYOR

[75] Inventor: Sidney S. Tolson, Scotland Neck, N.C.

[73] Assignees: Ossid Corporation, Rocky Mount, N.C.; Ibaraik Seiki Machinery Company, Ltd., Ibaraki, Japan

[21] Appl. No.: 56,840

[22] Filed: May 3, 1993

Related U.S. Application Data

[60] Division of Ser. No. 46,012, Apr. 12, 1993, which is a continuation-in-part of Ser. No. 967,403, Oct. 28, 1992, abandoned.

[51] Int. Cl.⁵ ............................................. B65G 15/14
[52] U.S. Cl. ............................ 198/626.5; 198/626.1; 198/594; 198/812
[58] Field of Search ................. 198/626.1, 626.5, 594, 198/588, 812

[56] References Cited

U.S. PATENT DOCUMENTS

| | | | |
|---|---|---|---|
| 4,056,202 | 11/1977 | Mackenzie et al. | 198/626.1 X |
| 5,074,402 | 12/1991 | Bender-Zanoni | 198/626.5 X |
| 5,086,855 | 2/1992 | Tolson | 198/626.1 X |

FOREIGN PATENT DOCUMENTS

| | | | |
|---|---|---|---|
| 1917715 | 10/1970 | Fed. Rep. of Germany | 198/626.1 |
| 2636972 | 2/1978 | Fed. Rep. of Germany | 198/626.1 |

Primary Examiner—Cheryl L. Gastineau
Attorney, Agent, or Firm—Olive & Olive

[57] ABSTRACT

A controllable length conveyor suitable for use in a packaging machine comprises a pair of conveyor belts which are continuously driven in a given direction at a selected speed. The conveyor belts are mounted on a reciprocable frame and are arranged such that the product being conveyed resides between the belts and a run of each belt firmly engages and transports the product. The belt runs engaging the product can be made to extend and retract in correspondence with the product reaching a succeeding stage of packaging such as sealing.

5 Claims, 4 Drawing Sheets

CONTROLLABLE LENGTH CONVEYOR

REFERENCE TO RELATED APPLICATION

This application is a division of copending application Ser. No. 08/046,012, filed Apr. 12, 1993, entitled "PACKAGING MACHINE HAVING A CONVEYOR OF CONTROLLABLE LENGTH" pending, which in turn is a continuation-in-part of copending U.S. patent application Ser. No. 07/967,403 filed Oct. 28, 1992 entitled "BELT CONVEYOR PROVIDING A CONTROLLABLE LENGTH OF BELT RUN", abandoned.

FIELD OF THE INVENTION

The invention disclosed herein relates to a conveyor belt system whose length of belt run can be variably controlled and is illustrated as being applied to a packaging machine.

BACKGROUND OF THE INVENTION

Conveyor belts are frequently used to transport items from one location to another. A conveyor belt when used as a conveying means normally has a fixed length or run extending between end rollers on which the belt travels and which are located at the beginning and end of travel of the belt. Thus, the conventional belt conveyor has an operative surface or run of fixed length.

There are, however, operations requiring the use of a conveyor belt in which the length of the operative surface or run is required to change. An example of a conveyor belt extending between the beginning and the end of a conveyorized sealing process and in which the length of the operative run is required to periodically change during the course of moving items along a path is found in the reciprocable sealing bar section of an automatic film wrapping machine, such as that used to pack poultry for retail sale. As the speed of processing increases in such a variable length belt run system, the need to keep firm control of the product being packed also becomes increasingly important. In a widely used type of poultry packaging machine, a sheet of heat sealable film is formed into a tube around the product being packed. The tube is then cut and sealed along a line transverse to its center line at a series of locations essentially between successive wrapped items. The cutting and sealing of the film is accomplished by a pair of heated sealing bars which converge onto the film tube and travel with the tube for a selected distance to permit a dwell time sufficient to adequately seal and cut the tube. The heated bars then separate and move backward to their starting position. Such a machine is disclosed in Japanese patent No. 63-33230 to Tadoru Suga for "Operation Control Apparatus Of Seal Mechanism in Packaging Machine And Method Therefor". To allow the sealing bars to first move with and in the direction of the conveyor and then move back, there is disclosed in related Japanese patent application Serial No. 4-121,444, filed Apr. 15, 1992, a conveyor having a moving gap on its product carrying surface which reciprocates to accommodate the reciprocating sealing bars.

In order to maintain proper control of the product being wrapped in the process of the Suga disclosure and to improve thereupon, it has been found beneficial, according to the present invention, to have continuously driven vertical side conveyor belts which are used to hold the film wrapped package through the time it is sealed and cut off. Therefore, the present invention recognizes that the presence of continuously driven side conveyor belts which essentially elongate as the conveyor gap moves in one direction and contract as the conveyor gap moves in the other direction in order to follow the action of the varying moving gap conveyor surfaces would provide a means for enhancing control of the product being packaged.

Therefore, it is an objective of the present invention to provide a belt conveyor, typically comprising a pair of continuously driven belts between which the product travels, at least one run of which is capable of being changed in operative length.

It is an additional objective of the invention to provide a conveyor, typically comprising a pair of belts between which a product travels, having at least one run which while running continuously in a given direction may be adjusted in length automatically in coordination with a related process such as a sealing process in the same machine in which the conveyor is mounted.

It is a further more specific objective of the invention to provide a conveyor apparatus having a run which is variable in length while operating continuously to transport a product such as a film wrapped poultry product.

These and other objectives will become apparent from the disclosure which follows.

SUMMARY OF THE INVENTION

The present invention provides for general packaging machine application, but particularly for applications such as poultry packaging, a conveyor comprising a belt arrangement, typically in the form of a pair of opposed belts between which the product travels, at least one run of which while being continuously driven is capable of extending and contracting so as to vary in operative length. The belt of the conveyor passes around a series of parallel rollers in a serpentine path some of which rollers are fixed in position and some of which are movable in position. The rollers whose positions can be moved are mounted on a frame which moves reciprocally in synchronism with the sealing mechanism and other machine components in a direction parallel to the conveyor travel. Selected ones of the movable rollers are positioned outside of the fixed rollers while others of the moveable rollers are positioned between the fixed rollers. In the illustrated embodiments, at least one fixed roller is a driver roller and the other rollers are idler rollers.

DESCRIPTION OF THE INVENTION

Figure 1:
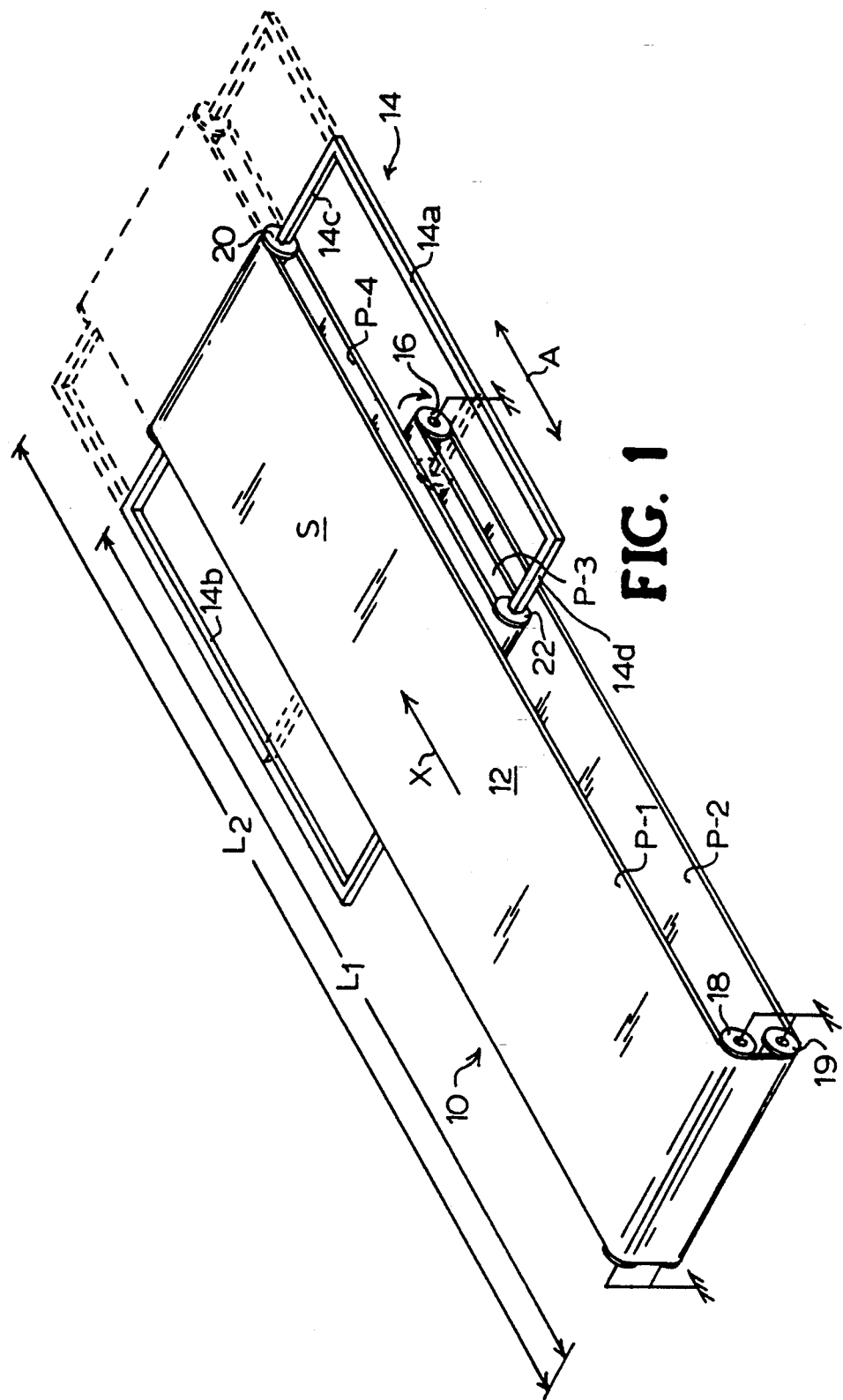
FIG. 1 is a perspective view of the reciprocal conveyor belt apparatus of the invention disassociated from a packaging machine and illustrated as a single belt in a horizontal orientation without supporting structure for clarity.

The general principles of the conveyor aspects of the present invention disassociated from a packaging machine are portrayed in the illustration of FIG. 1 in which belt 12 of the invention conveyor apparatus 10 is seen to continuously travel in the direction indicated by arrow X. Belt 12 of a defined length and uniform width and assumed to form part of a packaging machine follows a path which extends around a fixed driving roller 16, fixed idler rollers 18, 19, a movable end idler roller 20 and a movable center idler roller 22, all mounted substantially mutually parallel. When the conveyor 10 is set such that the run or operative surface S (on which arrow X is drawn) of belt 12 assumes any given length $L_1$ the operative surface S which is assumed to engage the packaged product, not shown, appears and acts as in any ordinary conveyor apparatus. The drive motion is imparted to belt 12 by the fixed driving roller 16 which is connected to a drive system, such as, for example, a gear motor (not shown) forming part of the packaging machine. The length of belt 12 is sufficient to follow the path described with adequate tension to maintain proper drive and be free of slack.

Movable end idler roller 20 and movable center idler roller 22 are each rotatably mounted on a movable frame 14 forming part of the packaging machine, not shown, which reciprocates in a manner such that when the frame 14 moves, both connected idler rollers 20, 22 move equivalently. Frame 14 is composed of frame members 14a, 14b, 14c and 14d and is mounted on a support structure (not shown) so that frame 14 is able to only move in a direction parallel to the direction of travel of belt 12, as depicted by double ended arrow A. Since the spacing between movable end idler roller 20 and movable center idler roller 22 is constant, the tensioned length of belt 12 is also necessarily constant. The length of the operative run or surface S of conveyor 10 may be increased from original run length $L_1$, for example, to a run length $L_2$ by moving frame 14 from its position shown in solid lines in FIG. 1 to its position shown in dashed lines. The run or operative surface S of conveyor 10 may conversely be shortened by movement of frame 14 in the opposite direction. During any such reciprocation of the frame 14, it is to be understood that belt 12 is driven constantly in the same direction.

With continuing reference to FIG. 1, it should be noted that the major portion of belt 12 effectively forms four distinct planar segments or runs P-1, P-2, P-3 and P-4 by being wrapped around the series of the previously described rollers according to the invention. It is important for belt 12 to retain a constant overall length of belt under tension and remain slack free during a change in the length of the run or operative surface S of the conveyor 10, e.g., from run length $L_1$ to run length $L_2$. This is accomplished by employing the pair of vertically spaced fixed idler rollers 18, 19 and locating moveable rollers 20 and 22 and fixed roller 16 in the positions indicated in FIG. 1. Particular emphasis is placed on frame 14 acting to assure a constant distance between moveable rollers 20 and 22. An alternate possibility recognized by the invention is that of using a substantially large diameter roller (not shown) in place of the idler rollers 18, 19 and in conjunction with the rollers 16, 20 and 22 located as seen in FIG. 1. Other alternative belt arrangements are later described in reference to FIGS. 5 and 6.

Figure 2:
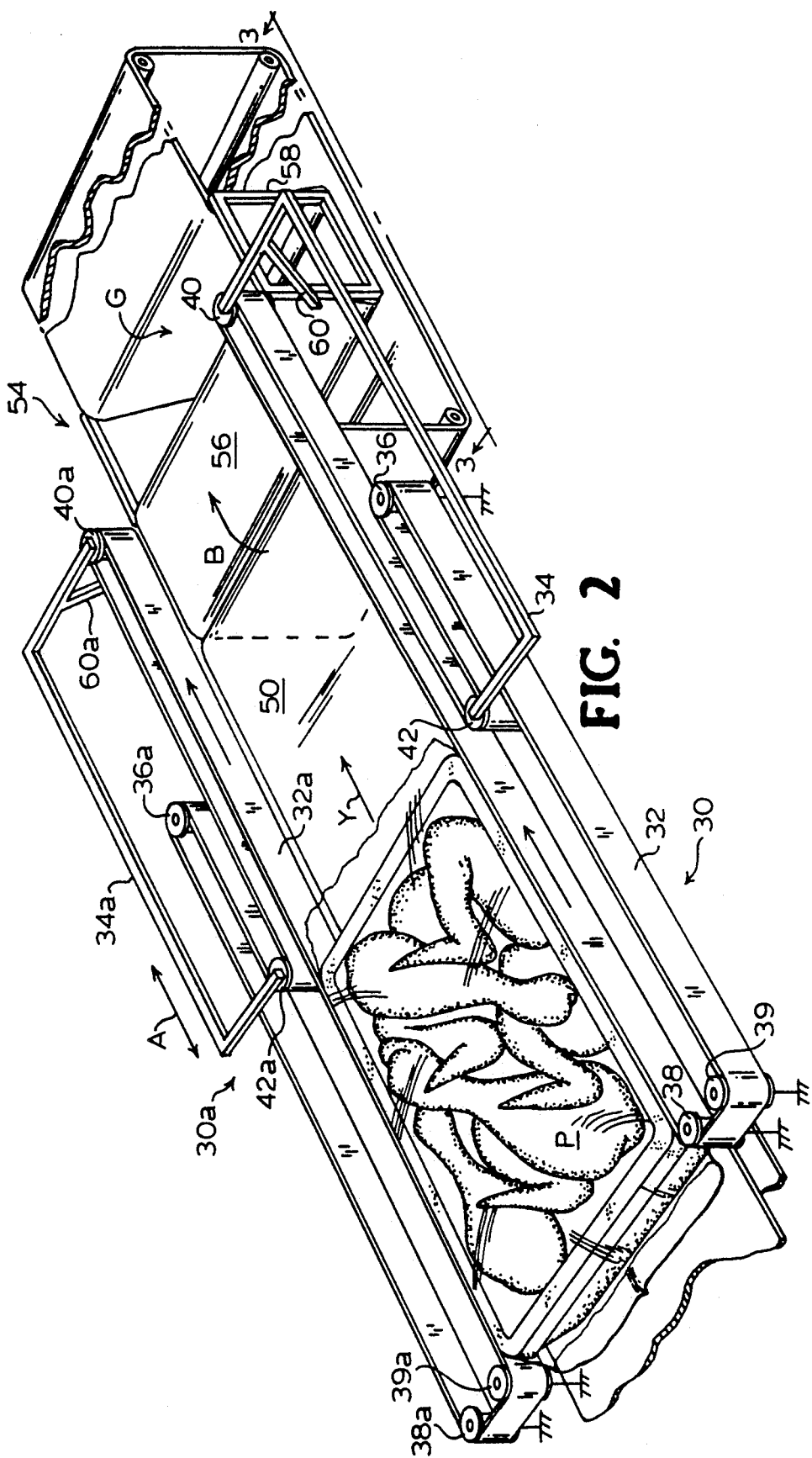
FIG. 2 is a perspective view of a portion of a poultry packaging machine incorporating a pair of reciprocal belt conveyors of the invention in vertical orientation on opposite sides of a horizontal belt conveyor shown feeding film wrapped poultry products to a horizontal moving gap type belt conveyor associated with a sealing mechanism, not shown.
Figure 3:
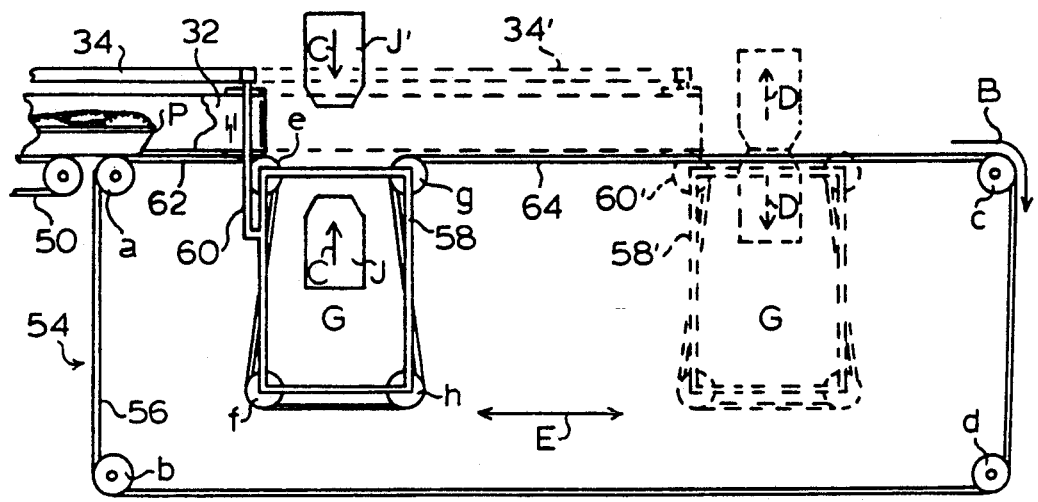
FIG. 3 is a partial side elevation view of one of the vertically oriented belt conveyors of the invention in operating cooperation with a horizontal belt conveyor having a moving gap and showing in dashed lines the position of the vertically oriented belt conveyor and of the gap and the sealing heads at the end of a sealing cycle.

A poultry packaging machine apparatus is depicted in FIGS. 2 and 3 in which a pair of conveyors 30, 30a built according to the invention are used in cooperation with other conveyor apparatus forming part of a sealing mechanism in the same machine.

According to the perspective view of FIG. 2, a pair of essentially mirror image conveyors 30, 30a are oriented in essentially parallel vertical orientations and are shown gripping and transporting a film wrapped poultry package P towards the sealing mechanism. Typical conveyor 30 while vertically oriented is configured and operates similarly to horizontal conveyor 10 of FIG. 1, and employs a fixed driver roller 36, fixed idler rollers 38, 39, 40, 42 and a reciprocable frame 34 on which rollers 40 and 42 are mounted. Horizontally oriented supply conveyor 50 on which the poultry package P is supported is driven in the same direction and at the same speed as conveyors 30, 30a and is situated between conveyors 30, 30a at a lower level than the pair of vertical belts 32, 32a with the plane of the upper portion of conveyor 50 extending between vertical belts 32, 32a being essentially perpendicular to the plane of the vertical belts 32, 32a. As supply conveyor 50 transports the film wrapped poultry package in the direction of arrow Y, conveyors 30, 30a, moving in the same direction and at the same typically fixed speed as supply conveyor 50, contact side portions of the film wrapped poultry package P and add significantly to the grip and control maintained on package P during continued transport towards the sealing mechanism.

At the discharge end of horizontal supply conveyor 50, the poultry package P is transferred to a horizontally oriented gapped conveyor 54 which facilitates completion of the transverse seals in the process of completing the poultry package P. Gapped conveyor belt 56 is guided by and passes over a series of later described rollers to form an exaggerated "U" pattern when viewed from the side as best seen in FIG. 3.

A further detailed view of the configuration and function of gapped conveyor 54 is seen in FIG. 3 to be viewed together with FIG. 2. Supply conveyor 50 discharges the poultry package P at the left of FIG. 3 and transfers the poultry package P to gapped conveyor 54. At this stage, it is to be understood that the transverse seals at the leading and trailing ends of the film wrapped poultry package P have not been completed. Corner rollers a, b, c, d, seen in FIG. 3, are mounted in fixed positions on the packaging machine frame (not shown). At least one of said rollers a, b, c or d is connected to a packaging machine drive means (not shown) to impart drive to gapped conveyor belt 56 in the direction indicated by arrow B (FIG. 2). Center rollers e, f, g and h (FIG. 3) are mounted on a gapped conveyor frame 58 which reciprocates (arrow E) according to the cycle of the packaging machine as described in the previously referred to Japanese patent application Serial No. 4-121,444. As gapped conveyor frame 58 moves during the transverse sealing operation from its solid line indicated position to its dashed line indicated position, gap G in gapped conveyor belt 56 moves accordingly. This change in position of gap G, at best seen in FIG. 3, causes the upper left belt horizontal surface 62 of belt 56 and upper right horizontal belt surface 64 of belt 56 to vary reciprocally in length with respect to one another. That is, as the upper horizontal belt surface 62 and the upper right horizontal belt surface 64 reciprocate, belt surface 62 lengthens and belt surface 64 shortens as the frame 58 moves to the right as viewed in FIG. 3 and belt surface 62 shortens and belt surface 64 lengthens as the frame 58 moves to the left as viewed in FIG. 3. Throughout this reciprocation process, the belt 56 continues to move in the direction indicated by arrow B and at substantially the same speed as that of conveyors 30, 30a and 50.

In the step of sealing and cutting the wrapping film, sealing bars J, J', initially in the position shown in solid lines in FIG. 3, move toward each other (indicated by arrows C—C) to a sealing position, then travel together while in the sealing position along the path of conveyor belt 56 to the position shown in dashed lines, then separate (indicated by arrows D—D), and lastly move backward to their initial positions. This reciprocating sealing bar travel system allows bars J, J' to maintain continuous contact with the wrapping film for the maximum time while not requiring the conveyor to slow or stop. The objective of the reciprocal movement of gap G is to allow sealing bars J, J' when sealing to travel along the direction of the conveyor belt as described above.

The use of a gap conveyor with reciprocating sealing bars has been known as previously stated. However, it has not been known to provide a packaging machine with a conveyor of variable length to feed film wrapped packages to, and to operate in correspondence with, the reciprocating sealing mechanism as next described.

Gapped conveyor frame 58 is appropriately connected to frames 34, 34a of vertical conveyors 30, 30a by connecting linkage 60, 60a so that as the upper right horizontal belt surface or run 62 of gapped conveyor 54 increases or decreases in length, the vertical belts 32, 32a of the conveyors 30, 30a simultaneously change length by an equivalent amount, as shown in dashed lines at 34' in FIG. 3. In this manner, the belts 32, 32a comprising conveyors 30, 30a keep continuous contact with and control over the film wrapped poultry package P while it is being transported and sealed.

While not illustrated, it is recognized that frames 34, 34a may be mounted to be transversely slidably or otherwise connected to gap conveyor frame 58 in a manner which permits frames 34, 34a to be adjusted transversely and the spacing between conveyor belts 30, 30a to be adjusted to accommodate to various widths of the film wrapped package P as illustrated in U.S. Pat. No. 5,137,099, the contents of which are incorporated herein by reference.

As best illustrated in FIG. 3, it will be noted that conveyor belts 30, 30a in the retracted position, shown in solid lines, overlap run 62 of the gapped conveyor 54 and maintain this overlapping relation in the extended position shown in dashed lines in FIG. 3. Throughout this change of position, it should be appreciated that conveyor belts 30, 30a continue to move at their respective fixed speed and in the direction indicated. Thus, very positive control of the film wrapped package P is maintained throughout the sealing cycle extending between arrows C—C and D—D.

Figure 4:
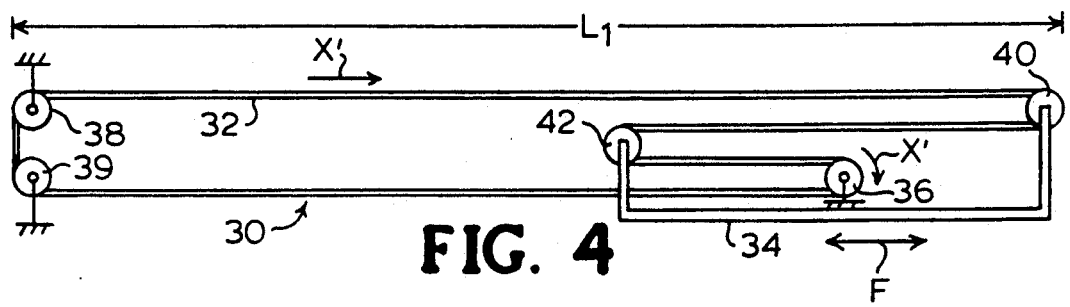
FIG. 4 is a top plan view of a vertically oriented belt conveyor of the invention disassociated from the packaging machine and depicting the path of belt travel when all runs of the belt are mutually parallel.

FIG. 4 illustrates the construction of the conveyor 30 in top plan view to show the typical roller and belt configuration of the conveyors 30, 30a. Belt 32 is driven by roller 36 which is mounted on and driven by a packaging machine drive (not shown) and belt 32 travels in the direction of arrow X'. Belt 32 wraps around idler rollers 38, 39 whose locations are fixed on the packaging machine frame. Belt 32 also wraps in serpentine fashion to form four parallel planar segments or runs which extend around movable end idler roller 40 and movable center idler roller 42. Both idler rollers 40, 42 are mounted on movable frame 34 which is movable in either direction as indicated by arrow F (FIG. 4). As frame 34 moves left or right, both idler rollers 40, 42 move in unison therewith and the run length $L_1$ increases or decreases accordingly while belt 32 continues to move in the direction of X' at its fixed speed. A physical limit is that frame 34 may only move right until movable center idler roller 42 approaches driver 36 to the extent that driving contact between driver roller 36 and belt 32 is not lost. However, appropriate modifications can be made to maximize the available movement of frame 34.

Whereas the preferred embodiment of the variable conveyor belt invention is directed to a roller and belt configuration in which all runs of the variable length belt remain mutually parallel, the invention further recognizes, according to a second embodiment, that it is essential to maintain parallelism only between those runs of belt which vary in length. Runs of belt which, in contrast, are fixed in length need not be parallel, adding to design flexibility. Examples of two embodiments having divergent, or non-parallel, runs of belt are depicted in FIGS. 5 and 6.

Figure 5:
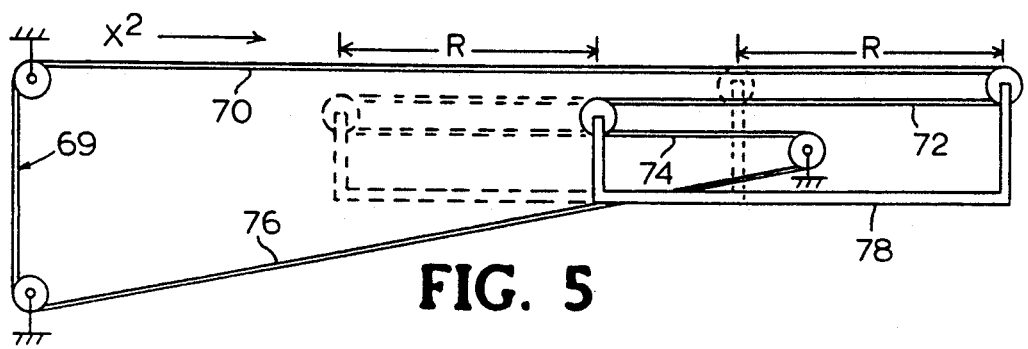
FIG. 5 is a top plan view of a vertically oriented belt conveyor according to the invention disassociated from the packaging machine and depicting the path of belt travel when three runs of belt are parallel and one run of belt is divergent.
Figure 6:
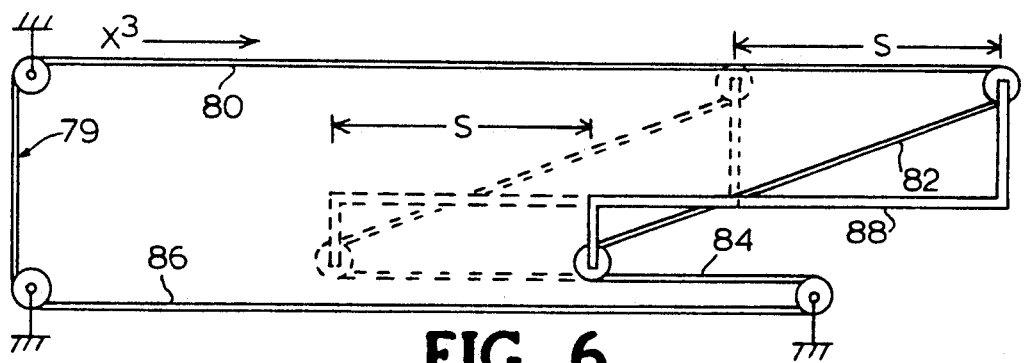
FIG. 6 is a top plan view of a vertically oriented belt conveyor according to the invention disassociated from the packaging machine and depicting the path of belt travel when three runs of belt are parallel and one run of belt is divergent but with the divergent run being different from that shown in FIG. 5.

A comparison is made between FIG. 4 in which all runs of the packaging machine variable conveyor belt are parallel to each other and FIGS. 5 and 6 in which three runs of belt are parallel and one run is non-parallel. The line of lateral movement of the packaging machine belt length-modifying frame, illustrated as arrow F in FIG. 4, arrow R in FIG. 5 and arrow S in FIG. 6 are to be considered the foundation to which parallelism is compared.

FIG. 5 shows runs 70, 72 and 74 of the packaging machine variable conveyor belt 69 parallel to arrow R, and run 76 non-parallel thereto. Run 72 of FIG. 5 is moved laterally by frame 78, while retaining a constant length. As the packaging machine frame 78 reciprocates, run 74 changes in length in inverse relation to the change in length of run 70. Since the runs which change length as the frame 78 moves laterally increase or decrease in length in complementary relation, the invention recognizes that runs 70 and 74, consistent with the geometry, must remain parallel. The invention also recognizes that runs 72 and 76 which do not change length need not be parallel to each other, although in FIG. 5, only run 76 is divergent.

With continuing reference to FIG. 5, as the packaging machine frame 78 moves from right to left that is, from the solid to the dashed line position, run 70 decreases length by the amount indicated by arrow R, and run 74 increases length by the length of arrow R. Movement in the opposite direction causes the converse changes to occur. Throughout the reciprocation of frame 78, the conveyor belt 69 continuously rotates in the direction of arrow X2 and typically at a fixed speed.

In FIG. 6, a different version of this parallel/non-parallel configuration is illustrated. As shown, runs 80, 84 and 86 of the packaging machine variable conveyor belt 79 are parallel to the movement indicated by arrow S. Run 82 is not parallel thereto. Since run 82 exists between the ends of the reciprocable packaging machine frame 88, the invention recognizes that run 82 will not change in length and therefore need not be parallel to the movement indicated by arrow S.

As frame 88 moves, run 80 and run 84 respectively increase and decrease length reciprocally. The variable conveyor belt 79 at the same time is continuously moving and conveying the film wrapped package (not shown in FIG. 6) in the direction of arrow X3.

Though not illustrated, a third packaging machine variable belt configuration having a non-parallel run of belt is achieved by combining the divergent sides illustrated in FIGS. 5 and 6, i.e. having both run 82 and run 86 divergent from the movement direction of the reciprocable packaging machine frame 88.

The provision of a film wrapped package transport conveyor which while running continuously in the transport direction is able to extend and retract in length and with one or more runs being non-parallel, increases the flexibility of the packaging machine design. The ability to vary the belt run angle and the pulley position furthermore allows accommodation to many special situations encountered in packaging machine design.

As will be apparent from the description, the variable packaging machine conveyor belt of the invention is capable of being changed in operative run length in a variety of packaging machine applications. The principles of the invention are applicable to a variety of packaging machine belt systems without regard to the material of which the variable conveyor belt is made or how it might be constructed. Thus, the term "belt" is intended to be used in a broad sense and to apply to solid flat belts as illustrated, chain-link belts, narrow belts, belts fitted with pushers and the like so long as at least one side of the belt is formed to engage and move the product being packaged along a defined path all of which will be understood by those skilled in the art.

Whereas the embodiments described relate to specific configurations and uses, they are not to be construed as limitations of the scope of the invention which is to be interpreted according to the claims which follow.

What is claimed is:

1. A belt conveyor apparatus for conveying products along a horizontal path, comprising:
   (a) a pair of opposed continuous conveyor belts each having a defined length and width and at least one side formed with a product engaging surface disposed in a vertical plane for engaging and moving said products along a defined horizontal path corresponding to a run of the belt, said belts being positioned such that said products are gripped between said pair of belts while being conveyed thereby;
   (b) belt guiding and frame means portions of which are reciprocable mounting said belts for substantially slack free travel and in a manner to form substantially the entire length of each said belt into a plurality of non-coplanar runs some of which are parallel and some of which are permitted to vary in length and position dependent on reciprocation of the reciprocable portions of said belt guiding and frame means;
   (c) means operatively associated with said belts for simultaneously driving said belts continuously in the same direction and at a selected speed;
   (d) means for reciprocating the reciprocable portions of said belt guiding and frame means to vary the length and position of those runs permitted to vary while maintaining said belts including those runs permitted to vary moving in said direction and at said speed; and
   (e) a horizontal conveyor belt driven at the same said selected speed and in the same direction as said pair of opposed belts, mounted on said belt guiding and frame means and located between said pair of vertical belts and operative to support said products while being conveyed by said vertical belts.

2. A belt conveyor apparatus as claimed in claim 1 wherein said means for driving said belts maintains said selected speed fixed during reciprocating of said belt guiding and frame means reciprocable portions.

3. A belt conveyor apparatus as claimed in claim 1 wherein leading ends of said pair of vertical belts are continuously maintained forward of the horizontal conveyor belt leading end by the positioning of said belt guiding and frame means reciprocable portion.

4. A belt conveyor apparatus as claimed in claim 1 wherein at least one of which runs remains fixed in both length and position.

5. A belt conveyor apparatus as claimed in claim 1 including an auxiliary reciprocable mechanism and wherein said means for reciprocating the reciprocable portions of said belt guiding and frame means operates in synchronism with said auxiliary reciprocable mechanism.

* * * * *